United States Patent
Sharpe et al.

(10) Patent No.: US 12,429,571 B2
(45) Date of Patent: Sep. 30, 2025

(54) RANGING MEASUREMENT EMPLOYING BASEBAND COHERENCE

(71) Applicant: SAMSUNG ELECTRONICS CO., LTD., Suwon-si (KR)

(72) Inventors: Jacob Christopher Sharpe, Cambridge (GB); Fei Tong, Cambridge (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 372 days.

(21) Appl. No.: 18/061,510

(22) Filed: Dec. 5, 2022

(65) Prior Publication Data
US 2024/0183965 A1  Jun. 6, 2024

(51) Int. Cl.
*G01S 11/08* (2006.01)

(52) U.S. Cl.
CPC ..................................... *G01S 11/08* (2013.01)

(58) Field of Classification Search
None
See application file for complete search history.

(56) References Cited

U.S. PATENT DOCUMENTS

| | | | |
|---|---|---|---|
| 4,278,977 A * | 7/1981 | Nossen | G01S 13/79 342/125 |
| 4,799,062 A * | 1/1989 | Sanderford, Jr. | G01S 5/0284 340/8.1 |
| 6,331,837 B1 | 12/2001 | Shattil | |
| 7,139,581 B2 | 11/2006 | Berliner et al. | |
| 7,634,012 B2 | 12/2009 | Farhang-Boroujeny et al. | |
| 7,986,925 B2 | 7/2011 | Alford et al. | |
| 8,478,294 B2 | 7/2013 | Levin et al. | |
| 8,514,785 B2 | 8/2013 | Anekoji et al. | |
| 8,526,391 B2 | 9/2013 | Issakov et al. | |
| 8,976,692 B2 | 3/2015 | Persson et al. | |
| 9,344,311 B2 | 5/2016 | Nilsson | |
| 9,531,447 B2 * | 12/2016 | Aryanfar | H04L 25/0204 |
| 9,554,413 B2 | 1/2017 | Burra et al. | |
| 9,729,254 B1 | 8/2017 | Zhou et al. | |
| 9,813,867 B2 | 11/2017 | Prevatt | |
| 9,915,724 B2 | 3/2018 | Amizur et al. | |
| 9,933,509 B2 | 4/2018 | Hill et al. | |
| 9,998,242 B2 | 6/2018 | Jiang et al. | |
| 10,056,993 B2 | 8/2018 | Clancy et al. | |
| 10,057,798 B2 | 8/2018 | Jarvis et al. | |

(Continued)

FOREIGN PATENT DOCUMENTS

| | | | | |
|---|---|---|---|---|
| CN | 111025359 A | * | 4/2020 | G01S 19/43 |
| DE | 102019132072 | | 5/2022 | |

OTHER PUBLICATIONS

"Who We Are: Our Brands"; no author given; copyright in the year 2024; published by the Wi-Fi Alliance; Austin, TX, USA; posted on the Internet at wi-fi.org. (Year: 2024).*

"Brand Guide for Bluetooth Trademarks"; no author given; dated Jun. 2022; published by the Bluetooth Special Interest Group; Kirkland, WA, USA; posted on the Internet at bluetooth.com. (Year: 2022).*

(Continued)

*Primary Examiner* — Bernarr E Gregory
(74) *Attorney, Agent, or Firm* — Morgan, Lewis & Bockius LLP

(57) ABSTRACT

A one way ranging method estimates a distance between first and second wireless devices using a technique that involves exchanging dual tone RF signals between the devices and, at each of the first and second devices, maintaining "baseband coherence" between baseband signals carried by the RF signals transmitted and received by each respective device.

20 Claims, 8 Drawing Sheets

(56) References Cited

U.S. PATENT DOCUMENTS

| | | |
|---|---|---|
| 10,805,135 B2 | 10/2020 | Lang et al. |
| 2012/0002742 A1* | 1/2012 | Cheng ................... H04L 25/022 |
| | | 375/267 |
| 2014/0200882 A1* | 7/2014 | Xia ....................... H04L 5/0005 |
| | | 704/205 |
| 2018/0295470 A1 | 10/2018 | Markhovsky et al. |
| 2018/0299531 A1 | 10/2018 | Hiscock et al. |
| 2020/0099561 A1* | 3/2020 | Lee ....................... H04L 27/265 |
| 2020/0166631 A1 | 5/2020 | Tong et al. |
| 2020/0319329 A1* | 10/2020 | Shahar-Doron ...... H04L 25/022 |
| 2021/0168781 A1 | 6/2021 | Lee et al. |

OTHER PUBLICATIONS

"Guidance for use of the LTE logo"; no author given; retrieved on Feb. 5, 2025; published by the 3GPP Partners; Sophia Antipolis, France; posted on the Internet at www.3gpp.org. (Year: 2025).*

J. E. Hodkin et al., "Microwave and millimeter-wave ranging for coherent distributed RF systems," 2015 IEEE Aerospace Conference, Big Sky, MT, USA, 2015, pp. 1-7, doi: 10.1109/AERO.2015.7118937. (Year: 2015).*

J. Huang et al; "Dual-Tone Radio Interferometric Ranging Using PXI"; Proceedings of the 10th International Conference on Communications and Networking in China (ChinaCom); published by IEEE; Piscataway, NJ, USA, in the year 2015; publication 978-1-63190-077-8. (Year: 2015).*

\* cited by examiner

RANGING MEASUREMENT EMPLOYING BASEBAND COHERENCE

TECHNICAL FIELD

The present disclosure relates generally to wireless communications and more particularly to ranging measurements between wireless devices in a multi-path signal environment.

DISCUSSION OF RELATED ART

Distance ("ranging") measurements between two wireless devices may be made by measuring a round trip time (RTT) for signal propagation between the two devices. Some existing ranging measurements involve measuring time of departure (ToD) and time of arrival (ToA) of sounding signals (test signals) at each device and exchanging the ToA/ToD data. The ToA may be estimated by measuring phase of the sounding signal (after downconversion to baseband) at a time following an initiation sequence. In a multi-path environment, however, the phase measured at any given frequency may be altered by constructive and destructive interference of multi-path signals with the line-of-sight signal, yielding an inaccurate distance measurement.

The ability to measure distance between two radios is a desirable property and useful in many applications such as access granting (e.g., the measured distance must be within a predetermined range to grant access) and device/asset tracking. Such distance measurements may be particularly useful in short range wireless technologies such as Bluetooth® and wireless local area networks (WLAN). Consequently, at present, the Bluetooth® standard is being extended to support this feature. One consideration is a Round Trip Phase (RTP) technique, which may achieve accurate distances. This is a phase based method using narrow band continuous wave (CW) signals, that essentially relies on measuring the phase of the carrier wave after an effective reflection at the reflector (akin to a radar reflection). While accurate, this ranging technique is insecure because, due to the simplicity of the technique, the method is easily spoofed, for instance with a simple delay. Therefore, it is not an adequate stand-alone solution for secure ranging applications. Further, with RTP, proprietary solutions can measure the one way range by careful coordination of their local oscillators, but this a difficult control task that may be prone to errors and/or require a prohibitively complex implementation.

Another technique, called Round Trip Time (RTT), is inherently robust to delay attack and has also been added to the Bluetooth® standard. This measures the time of flight between the devices. Generally, RTT is less accurate than RTP but is included in the standard for security as the RTP measurements are easily spoofed. Co-pending U.S. patent application Ser. No. 16/690,857 by the inventors herein, filed Nov. 21, 2019 and entitled ANGLE/TIME OF ARRIVAL MEASUREMENT USING NARROWBAND SIGNALS (hereafter, "the '857 application") now U.S. Pat. No. 11,525,909, improves the accuracy of the RTT measurements in a high signal to noise environment. However, like the RTP measurements this is still a two way ranging measurement and whilst there is no unambiguous distance in RTT, the multi-path signals may be convoluted as a result.

SUMMARY

In accordance with the present disclosure, a "one way" ranging method estimates a distance, and in some cases multi-path distances and angles of arrival, between first and second devices using a technique that involves exchanging dual tone RF signals between the devices and, at each of the first and second devices, maintaining "baseband coherence" between baseband signals carried by the RF signals transmitted and received by each respective device.

In an embodiment of a ranging method, at a first device, a first RF signal (a sounding signal) having first and second tones separated in frequency by $2\Delta f$ is transmitted at a first time point. At a second device: the first RF signal is received and a first baseband signal is derived therefrom; first and second complex gain responses (CGRs) respectively corresponding to the first and second tones are computed using Discrete Fourier Transform (DFT) processing of samples of the first baseband signal taken at a time beginning at a second time point; and a second RF signal is generated. The second RF signal also has the first and second tones and is transmitted at a third time point occurring ($J \times T$) after the second time point, where J is an integer and T equals $1/\Delta f$. The first device receives the second RF signal and derives a second baseband signal; computes third and fourth CGRs respectively corresponding to the first and second tones of the second RF signal using DFT processing of samples of the second baseband signal taken at a time beginning at a fourth time point occurring ($K \times T$) after the first time point, where K is an integer. A propagation delay of the first or second signal between the first and second devices is estimated using the first through fourth CGRs.

In an embodiment, a first wireless device includes transceiver circuitry configured to: generate a first baseband signal; generate a first RF signal based on the first baseband signal and transmit the first RF signal to a second wireless device, the first RF signal including at least first and second tones; receive a second RF signal from the second wireless device, the second RF signal including at least the first and second RF tones; derive a second baseband signal from the received second RF signal; and maintain baseband coherence between the first baseband signal and the second baseband signal for a distance estimation between the first and second wireless devices.

BRIEF DESCRIPTION OF THE DRAWINGS

The above and other aspects and features of the inventive concept will become more apparent from the following detailed description, taken in conjunction with the accompanying drawings in which like reference characters indicate like elements or features. Various elements of the same or similar type may be distinguished by annexing the reference label directly with a second label or with a dash and second label that distinguishes among the same/similar elements (e.g., _1, _2). However, if a given description uses only the first reference label, it is applicable to any one of the same/similar elements having the same first reference label irrespective of the second reference label.

DETAILED DESCRIPTION OF EMBODIMENTS

The following description, with reference to the accompanying drawings, is provided to assist in a comprehensive understanding of certain exemplary embodiments of the inventive concept disclosed herein for illustrative purposes. The description includes various specific details to assist a person of ordinary skill in the art with understanding the inventive concept, but these details are to be regarded as merely illustrative. For the purposes of simplicity and clarity, descriptions of well-known functions and constructions may be omitted when their inclusion may obscure appreciation of the inventive concept by a person of ordinary skill in the art.

In embodiments of the inventive concept described below, through careful configuration of a transmit (TX) signal and receive (RX) signal correlations performed in each of two wireless devices involved in a ranging measurement, an estimate of the distance between the devices can be made through effectively phase based ranging on two modulated tones created by a sounding signal. In embodiments, the convolving of the multipath inherent in the above-mentioned '857 application is avoided, allowing for far superior resolution of multipath. The devices perform a "one way ranging measurement", but unlike standard methodologies for one way ranging, they do not require phase coherence to be maintained on the LO's. Instead, the coherence is implemented just for baseband clocks, which is easier to implement.

Figure 8:
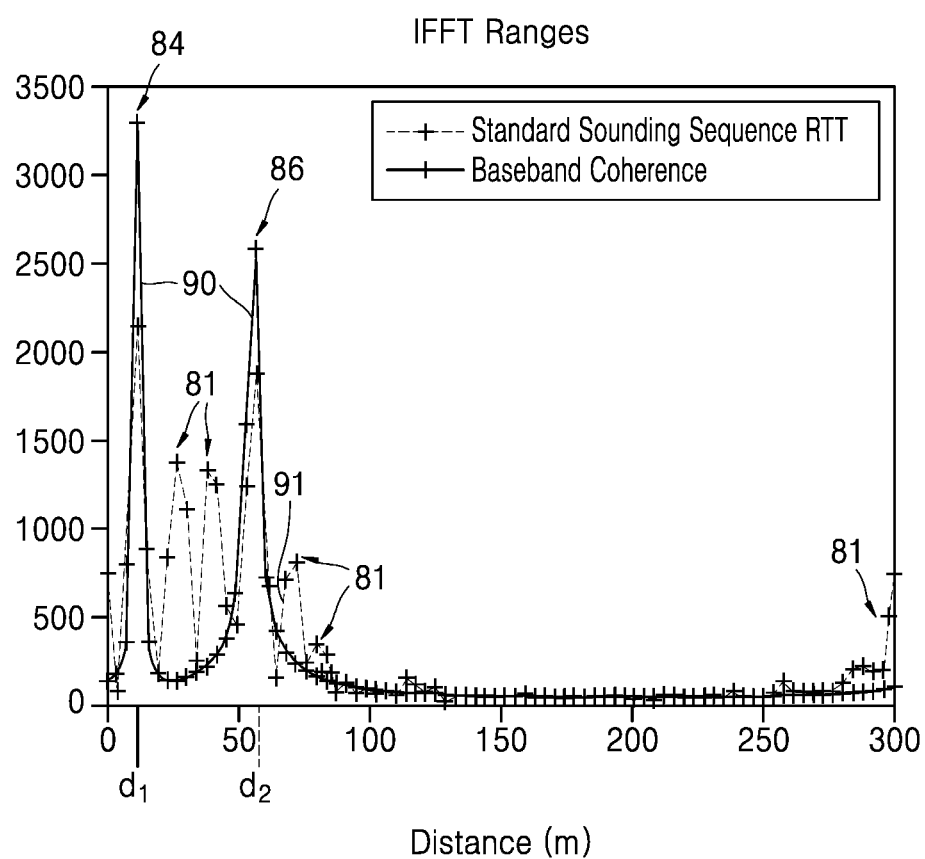
FIG. 8 is a graph of simulated propagation path distance measurement results of a line of sight signal and a multi-path signal between wireless devices as measured by an embodiment in comparison to a related art method.

In Bluetooth®-compatible and other types of applications, devices employing the technique of the U.S. patent application Ser. No. 16/690,857 by the inventors herein, filed Nov. 21, 2019 and entitled ANGLE/TIME OF ARRIVAL MEASUREMENT USING NARROWBAND SIGNALS, now U.S. Pat. No. 11,525,909 may add a sounding signal to a RTT measurement procedure. This technique allows an RTT application equal in accuracy to phase based ranging (RTP) to be achieved with good signal to noise ratio (SNR). Embodiments of the inventive concept herein may extend the approach of the U.S. patent application Ser. No. 16/690,857 by the inventors herein, filed Nov. 21, 2019 and entitled ANGLE/TIME OF ARRIVAL MEASUREMENT USING NARROWBAND SIGNALS, now U.S. Pat. No. 11,525,909 so that the sounding signal is used for a one way ranging estimate as opposed to or in addition to the two way methodology of the '857 application. This results in improved performance in multi-path environments as illustrated in FIG. 8 discussed later. Note that a security benefit may be obtained by combining the '857 application's method with the methods taught herein.

Some embodiments of the inventive concept, e.g., Bluetooth®-compatible embodiments, can use narrowband signals/radio to perform ranging measurements that achieve similar performance in a multi-path channel condition that was traditionally achieved by a wideband ranging technique (e.g., 40 MHz or wider). Compared to the wideband ranging techniques, these embodiments allow for the use of narrowband radio, which is inexpensive to build and consumes less power to operate. The narrowband signal can also achieve longer link coverage compared to a wideband signal with the same total transmit power. In other embodiments, e.g., with WLAN-compatible devices, up to a complete set of many OFDM tones in a WLAN or other OFDM waveform may be used during the ranging measurement, which may equate to a bandwidth of 40 to 80 MHz in a WLAN example. In either of the above cases, existing radio components such as those used in Bluetooth® or WLAN can be reused for the ranging application of the inventive concept.

Herein, the term wireless device refers to any device capable of transmitting and/or receiving a wireless signal. A wireless device may be a portable device, a handheld device, a fixed location device, a base station, etc., and may be configured for operation over any suitable protocol, such as Bluetooth® WI-FI®, LTE®, 5G, and so forth.

Figure 1:
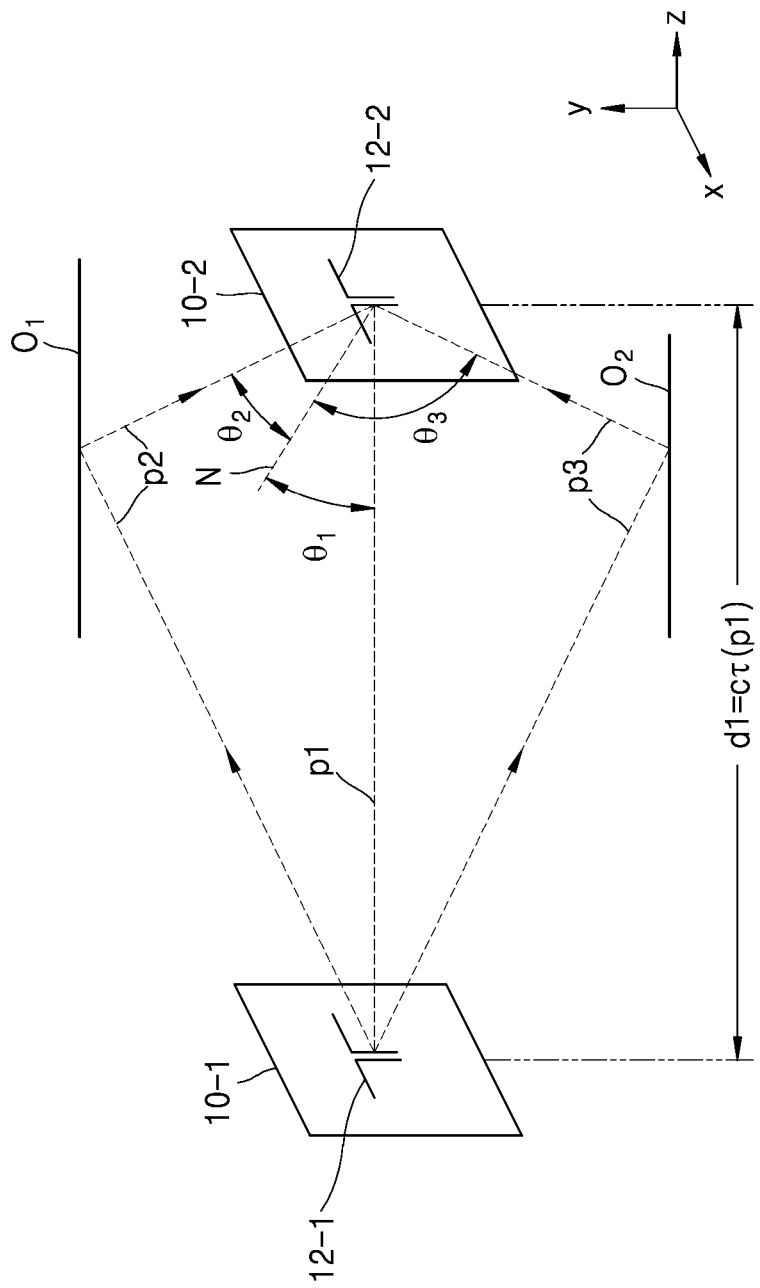
FIG. 1 illustrates a communication system including wireless devices in a multi-path environment.

FIG. 1 illustrates a communication system including wireless devices in a multi-path environment. A first wireless device 10-1 includes an antenna 12-1 that transmits a signal to a second wireless device 10-2 with an antenna 12-2. A line-of-sight signal (if one exists in the environment) may propagate along a line-of-sight path p1 and arrive incident upon the aperture of antenna 12-2 at an angle θ1 with respect to a normal N of antenna 12-2. (Each of antennas 12-1 and 12-2 may be embodied as a single antenna element or an array of elements.) Signal energy transmitted by antenna 12-1 may also be reflected by objects such as $O_1$ and $O_2$ in the communication environment and received by antenna 12-2 along multi-path channel paths p2 and p3 incident at angles θ2 and θ3, respectively.

Briefly, in accordance with embodiments described below, a one way line-of-sight distance d1=cτ (c=speed of light, τ=shortest propagation delay) may be determined using a timing and feedback scheme in which each wireless device 10-1 and 10-2 transmits and receives a dual tone sounding signal with substantially the same frequency characteristics using a "baseband coherence" timing method. A sequence of measurements may be performed over a frequency band of interest, where each measurement utilizes a different carrier frequency to generate dual tones, one above and one below the carrier frequency. Adjacent carrier frequencies may generate one common tone and one different tone with respect to each other. For each measurement, each wireless device 10-1 and 10-2 measures complex gain responses (CGRs) for the dual tones respectively received from the other device. One of the devices 10-1 or 10-2 may feed back the CGRs it measures to the other device. The propagation delay τ corresponding to the one way distance d1 may be estimated in correspondence with each carrier frequency. A stitching algorithm may be executed to obtain coherent channel responses (CCRs) distributed over the band, which take into account phase offsets between measurements for matching tones. A signal path calculation algorithm may then be run to arrive at a more accurate distance measurement and to determine angles of arrival and signal strengths of any multi-path signals. Through the use of the baseband coherence timing method for the one way range measurement in conjunction with the stitching and signal path calculation algorithms, superior results and/or a less complex circuitry/processing implementation relative to related art techniques may be realized.

Figure 2:
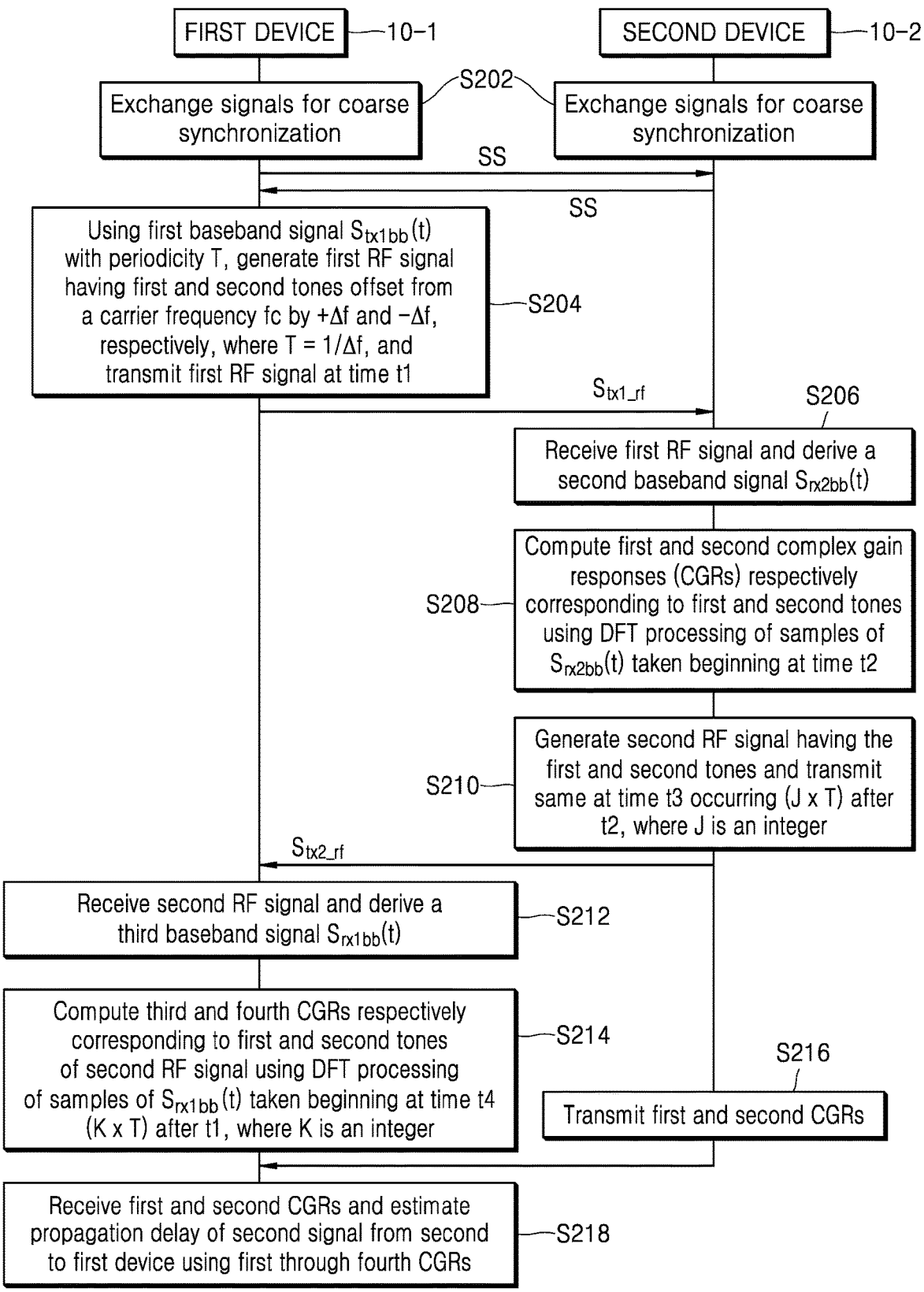
FIG. 2 is a flow diagram illustrating a ranging method according to an embodiment.
Figure 3:
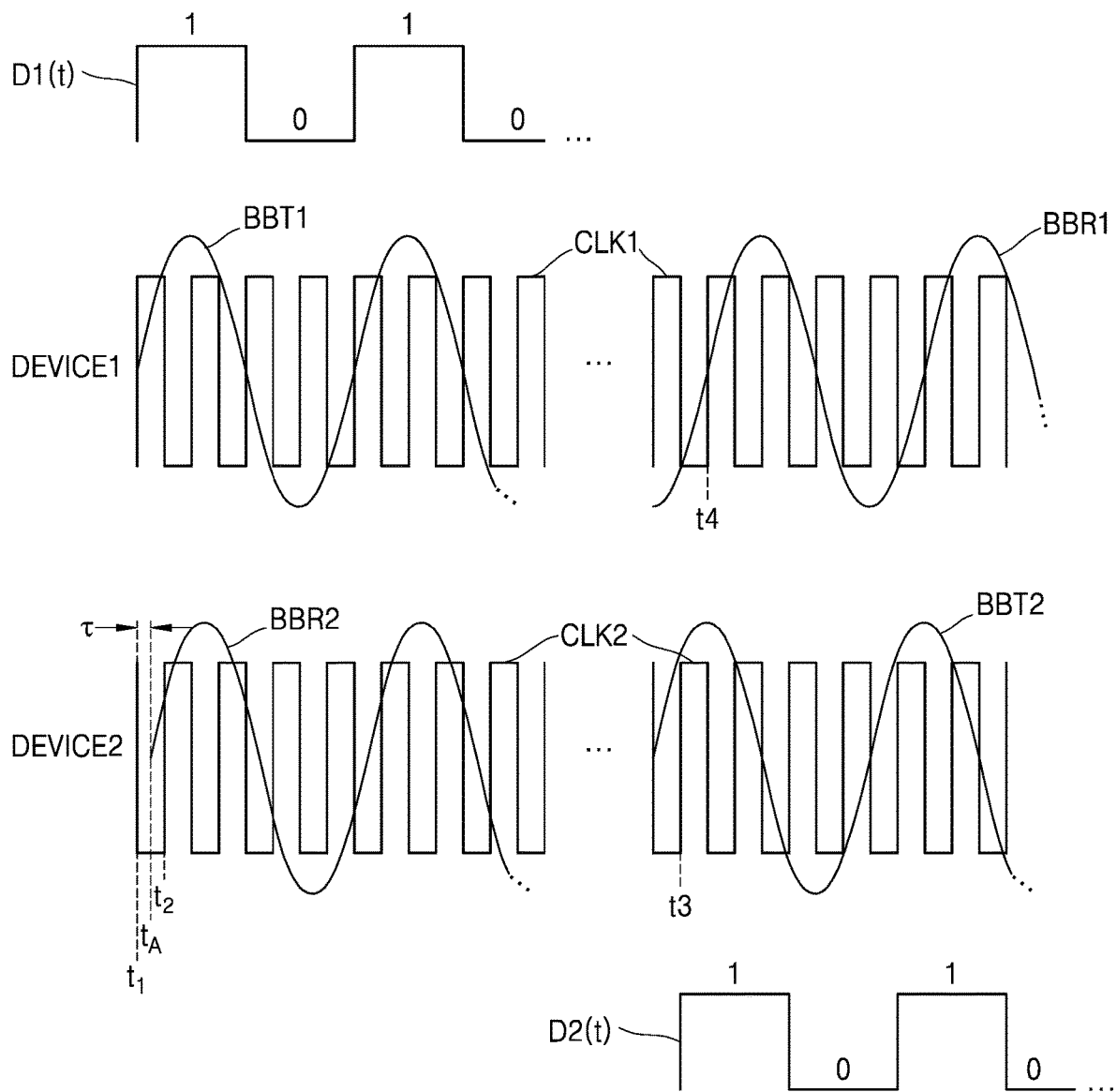
FIG. 3 is a signal timing diagram illustrating example signals and their timing relationships in the method of FIG. 2.

FIG. 2 is a flow diagram illustrating a ranging method, 200, according to an embodiment. FIG. 3 is a signal timing diagram illustrating example signals and their timing relationships in the method of FIG. 2. Briefly, with ranging method 200, baseband coherence is achieved between transmit (TX) transmission and receive (RX) correlations in each of the two devices 10-1 and 10-2. This baseband coherence is instrumental in achieving measurements implemented using narrowband hardware with improved resolution of multi-path signals (as will be illustrated later). A conceptual view of baseband coherence may be understood by considering tones of a sounding signal as continuous wave (CW) signals created by a mix of an intermediate frequency (IF) "$\Delta f$" with a main LO signal (where, for example, $\Delta f$ may be ±500 KHz in Bluetooth®, ±78.125 KHz in WLAN compatible with IEEE 802.11ax or later versions, or ±312.5 KHz in WLAN compatible with 802.11ac or earlier versions, where 312.5 KHz and 78.125 KHz are respective sub-carrier spacings). This operation is done at each of devices 10-1 and 10-2. The method may ensure that the mixes that create these two CW signals are coherent in TX and RX operations of the signal exchange. This may then be equivalent to phase coherence achieved in related art one way ranging through difficult to implement, carefully scheduled changes of the LO frequency. The baseband coherence of ranging method 200 is most easily obtained through either a continuous clock generating the mix for both the tones and RX correlations, or through a continuous loopback capture.

Figure 4:
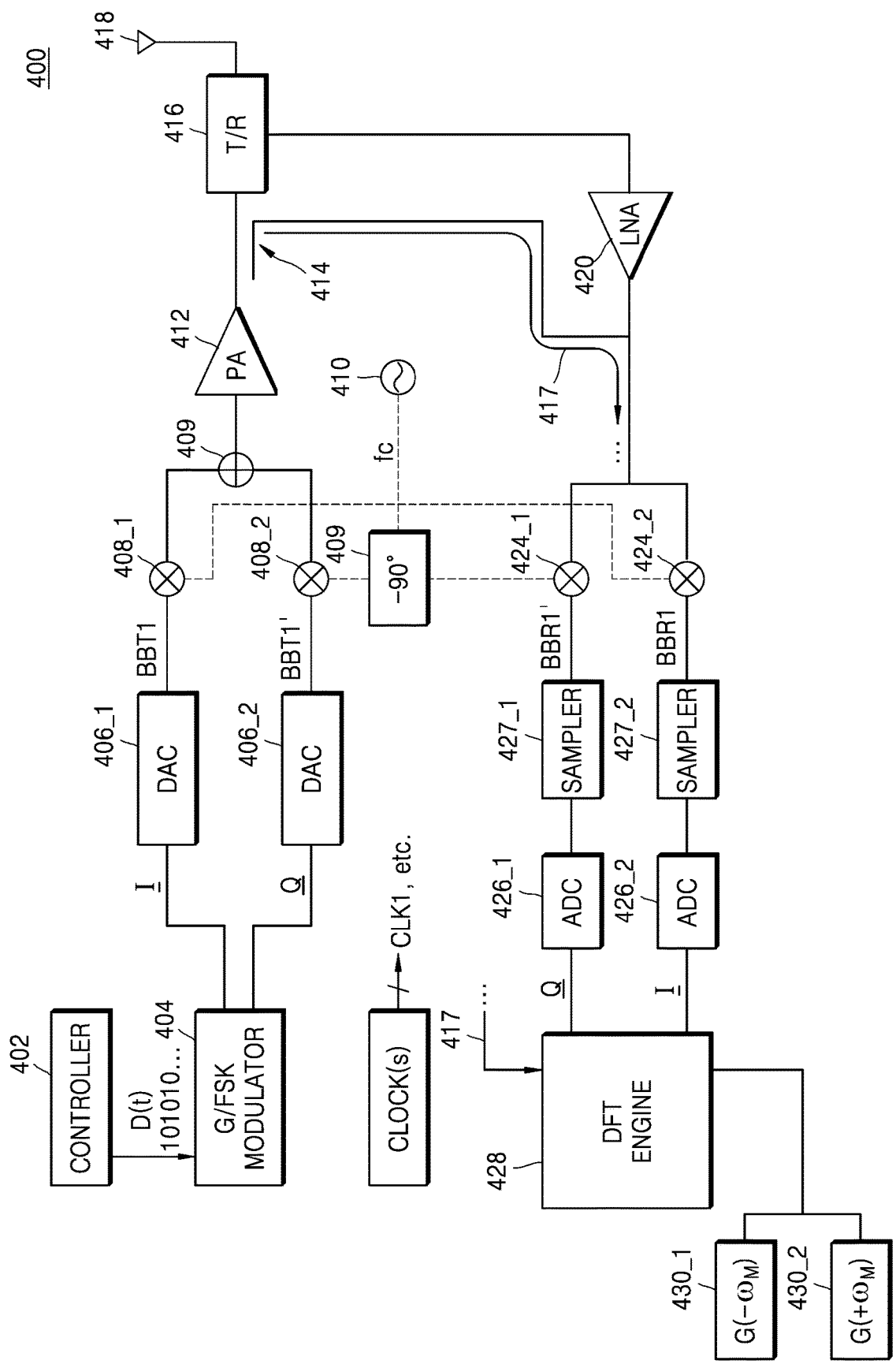
FIG. 4 is a schematic block diagram of example circuitry within a wireless device that may carry out the method of FIG. 2 according to an embodiment.

FIG. 4 is a block diagram of example transceiver circuitry 400 within each of first and second devices 10-1 and 10-2 to implement method 200. Transceiver circuitry 400 utilizes a loopback receiver architecture as an example. Referring collectively to FIGS. 2-4, in operation S202, first and second devices 10-1 and 10-2 may exchange synchronization signals SS with each other during a coarse synchronization handshake sequence. In a Bluetooth® system example, the coarse synchronization may be based on a pseudo random sequence in a Bluetooth® preamble/header. In a WLAN example (e.g., Wi-Fi® compatible communication in accordance with the IEEE 802.11 standard), a similar coarse synchronization signal exchange may be made.

In operation S204, the first device 10-1 generates a first RF signal (sounding signal) Stx1_rf having first and second tones offset from a carrier frequency fc by $-\Delta f$ and $+\Delta f$, respectively. The first RF signal Stx1_rf is generated through use of a first periodic baseband signal $S_{tx1bb}(t)$ with a periodicity T, where $T=1/\Delta f$. As seen in FIG. 3, the first RF signal is transmitted at a first time point t1. First baseband signal $S_{tx1bb}(t)$ may be a composite signal including an I channel signal BBT1 (shown in FIGS. 3 and 4) and a Q channel signal BBT1' (shown in FIG. 4), each having a periodicity T. BBT1 and BBT1' may each resemble a periodic sinusoidal signal, a sinusoidal signal that periodically changes phase (e.g., a periodic signal with a sinusoidal portion and an approximately Gaussian shaped portion at phase change regions due to smoothing of frequency and phase transitions), or may have another periodic signal waveform. For instance, as illustrated in FIG. 4, the first RF signal may be generated using a frequency shift keying (FSK) modulation scheme that generates the I and Q baseband signals, which are upconverted, combined and amplified to generate the first RF signal Stx1_rf. Transceiver circuitry 400 within each of devices 10-1 and 10-2 may perform the ranging method. (Note that most of the circuit elements may also be used in normal communications of the device.)

To generate the first RF signal, a controller 402 may generate a data signal D1(t) composed of a sequence of alternating 1's and 0's at a data rate of $2\Delta f$. For instance, in a Bluetooth® example, $2\Delta f$ corresponds to a 1 MHz bit rate (T=2 μs). In a Wi-Fi® example, $2\Delta f$ may correspond to T=3.2 μs. As an example, a sequence on the order of 30-100 bits may be used for one sounding signal measurement associated with a particular carrier frequency. Data signal D1(t) may be applied to a frequency shift keying (FSK) modulator 404, which may be a Gaussian FSK modulator that smooths transitions between symbols to reduce unwanted spectral components. It is noted here that controller 402 may include at least one processor that reads and executes instructions from a memory (not shown) within device 10 to perform its functions as described herein.

The remaining transmit chain upconverts the baseband signals to generate the first RF signal Stx1_rf and transmits the same at time t1 through antenna 418. To this end, modulator 404 outputs an FSK modulated digital signal which is applied to each of digital to analog converters (DACs) 406_1 and 406_2 in respective I and Q channels, where they are converted to BBT1 and BBT1', respectively. (In FIG. 3, only signal BBT1 is shown for simplicity of illustration.) Signals BBT1 and BBT1' may be upconverted by mixers 408_1 and 408_2, which respectively receive an I and Q local oscillator (LO) signal at a carrier frequency fc from LO 410 for the upconversion. The upconverted signals are added by an adder 409 and the added signal is amplified by a power amplifier (PA) 412 to provide the first RF signal Stx1_rf which may be routed through a transmit/receive (T/R) switch 416 for transmission through an antenna 418.

In an alternative architecture, a polar modulator replaces the chain of components 404 to 412, where the polar modulator may include an FSK baseband polar modulator (BPM) (replacing cartesian modulator 404), a phase locked loop (PLL) that receives a polar coordinate system phase value output from the BPM; and a single mixer that receives a first input from the PLL based on the phase value, and a second input at which a polar system amplitude value from the BPM is applied. The single mixer may output the first RF signal. A complementary polar demodulator may replace the relevant demodulation components of transceiver circuitry 400.

As seen in FIG. 3, time t1 may be a time aligned with (or otherwise referenced to) a clock transition of a sampling clock signal CLK1 generated by a sampling clock within clock generators 405 of device 10-1. Note that circuit path delays between the DAC 406 outputs and time t1 may be assumed to be negligible for the ranging measurement. Alternatively, an estimate of such delays may be taken into account in a calibration for the subsequent estimation of propagation delay. The first RF signal arrives at second device 10-2 at a time $t_A$ after a signal propagation delay τ to be estimated. If the shortest propagation path between devices 10-1 and 10-2 is a line of sight path, the line of sight distance d1 between the devices may be calculated as d1=cτ as noted earlier.

In a WLAN example (discussed further below), the first RF signal may be generated as an orthogonal frequency division multiplexing (OFDM) signal in a WLAN packet, in which two out of a plurality of OFDM tones (sub-carriers) of the packet correspond to the first and second tones. (In the WLAN case, additional tones, and in some cases, all the OFDM tones within an entire WLAN band, may be utilized in the ranging measurement signal exchange.) WLAN-compatible transceiver circuitry that generates and receives OFDM signals would be substituted for that shown in FIG. 4. Note that an 802.11ac WLAN packet may use OFDM modulation with a 312.5 KHz sub-carrier spacing; this translates to a 3.2 μs OFDM symbol duration (periodicity T=3.2 μs); and an 802.11ax WLAN packet may use OFDM modulation with a 78.125 KHz sub-carrier spacing; this translates to a 12.8 μs OFDM symbol duration (periodicity T=12.8 μs).

With continued reference to FIG. 2, at S206 the second device 10-2 receives the first RF signal and after downconversion derives a second baseband signal $S_{rx2bb}(t)$ therefrom. ($S_{rx2bb}(t)$ may be understood as a composite of signals BBR2 and BBR2' in respective I and Q channels after downconversion.) For instance, second device 10-2 may have the same circuit architecture as shown in FIG. 4, such that the first RF signal may be received through antenna 418, routed through a transmit/receive (T/R) switch 416; amplified by a low noise amplifier (LNA) 420; then split up into I and Q receive channel signals and applied to respective first input ports of mixers 424_1 and 424_2. LO 410 may output an LO signal at carrier frequency fc, which is split up and applied directly to a second input port of mixer 424_1 in the I channel and applied via delay element 409 with a 90° phase delay to a second input port of mixer 424_2. Mixers 424_1 and 424_2 downconvert the respective input RF signals to generate baseband signals BBR2 and BBR2' (only BBR2 is shown in FIG. 3 for simplicity of illustration).

At S208, second device 10-2 may compute first and second complex gain responses (CGRs) respectively corresponding to the first and second tones of $S_{rx2bb}(t)$, using digital fourier transform (DFT) processing of $S_{rx2bb}(t)$ samples. To this end, in second device 10-2, analog to digital converters (ADCs) 426_1 and 426_2 may convert the respective outputs of mixers 424_1 and 424_2 (after sampling by samplers 427_1 and 427_2) to digital signals, and a DFT engine 428 may compute DFT coefficients of the digital signals. CGR processing blocks 430_1 and 430_2 may obtain, based on the digital signals, CGRs at each of $-w_M$ and $+w_M$ ($w_M=2\pi\Delta f$) which correspond to CGRs at $(fc-\Delta f)$ and $(fc+\Delta f)$, respectively. In this process, the samples of $S_{rx2bb}(t)$ are assumed to be taken beginning at a time t2 after time $t_A$. Thus, there may be a "fractional delay" between the time $t_A$ at which the first RF signal is received and the time t2 at which the first sample is taken. The fractional delay may be due at least in part to a timing offset between the sampling clocks in devices 10-1 and 10-2.

At S210, second device 10-2 may generate a second RF signal Stx2_rf having the first and second tones $(fc-\Delta f)$ and $(fc+\Delta f)$ the same at a time t3 occurring $(J\times T)$ time units after t2, where J is an integer. Alternatively, in the loopback receiver architecture, "DFT alignment" discussed below may be sufficient to establish baseband coherence, such that (t3−t2) does not necessarily equal (J×T), as discussed below. In either case, a baseband signal $S_{tx2bb}(t)$ carried by (and used to generate) the second RF signal may be understood to be coherent with second baseband signal $S_{rx2bb}(t)$, since these signals have the same periodicity T and are separated in time by an integer multiple of T (or corresponding starting times of respective DFTs generated in a loopback receiver architecture are separated in time by an integer multiple of T). In architectures without a loopback receiver, timing adjustment may be made to the second RF signal through the use of time-stamps as described below.

The second RF signal may be generated and transmitted in the same manner as the first RF signal, beginning with the generation of a second data signal D2(t), through use of the same or similar transmit chain circuitry 402-422 employed within second device 10-2. (In other examples, the transmitter circuitry of second device 10-2 differs from that of first device 10-1. For instance, second device 10-2 may omit a loopback receiver mechanism, while first device 10-1 includes the loopback receiver mechanism, or vice versa.) Note that a second sampling clock of clock generators 405 in device 10-2 may have the same clock frequency (at least the Nyquist frequency, i.e., at least twice Δf) as the sampling clock in first device 10-1, but with a random phase offset. Further, in the example architecture of FIG. 4, loopback receiver circuitry with continuous capture may include a loopback coupler 414 and associated control/processing (e.g., within controller 402). The transmit time t1 of the first RF signal may be timestamped through the loopback receiver circuitry. The loopback mechanism may couple a portion of the first or second RF signal to be transmitted along a loopback path 417 to DFT engine 428. The loopback receiver mechanism provides a way for transmit (TX) and receive (RX) high precision time stamps to be achieved through DFT engine 428 for realizing the baseband coherence. For instance, by maintaining baseband coherence, a one way phase reference can be constructed for the lower tone on the path and then the variation of that phase for upper tone can be used to obtain one way phase dispersion for the channel across $2w_M$. In this manner, the loopback mechanism is used to construct a phase reference for use in obtaining third and fourth CGRs.

Other embodiments omit a loopback receiver mechanism and implement alternative architectures to achieve the desired baseband coherence. For example, a TX clock producing the modulation and a RX clock (both within clock generators 405) used for the correlations between the baseband TX and RX signals may be the same or have a known and constant phase relationship. In this case, from a time stamp of the starting point of the TX modulation it can be ensured that the RX correlation at device 10-1 (for achieving (t4−t1)=(K×T))) will start at the appropriate time t4. Similarly, at device 10-2, the starting point t2 of the RX correlation may be time stamped and then the starting point t3 of the TX modulation can be adjusted to achieve baseband coherence (for t3−t2=J×T). Or, if this timing adjustment is not possible with a particular system design, a correction can be made to the RX correlation results to account for the timing difference. There may also be resampling operations between the fundamental RX and TX clocks and the ADC or DAC clocks. When the phase relationship of these resampling operations is known then a further correction can be made. For instance, the RX correlation may be performed at a sampling rate different from the ADC rate for the sake of reducing processing complexity. This (different sampling rate) may require resampling, which will introduce processing delay. Therefore, the timing obtained from the resampled sequence may be later than that of the original signal seen at the ADC point, but the timing may be corrected. Further, as mentioned earlier, delays going from baseband to RF may be compensated for, and if re-samplers are employed which are fractional, these delays may dynamically change. The phase of the re-sampling operation may be determined and referenced to compensate for such changing delays.

At S212, first device 10-1 receives the second RF signal as a receive signal $S_{rx2bb}(t)$, from which a third baseband signal $S_{rx1bb}(t)$ (composed of I and Q component signals BBR1 and BBR1') may be recovered through the receive path circuitry in the same manner as just discussed for the second baseband signal. At S214, the first device computes third and fourth CGRs respectively corresponding to first and second tones of the second RF signal using DFT processing of $S_{rx1bb}(t)$ samples taken beginning at time t4 occurring (K×T) after time t1, where K is an integer. Thus, at device 10-1, baseband coherence is maintained between the baseband signal generated on transmit, $S_{tx1bb}(t)$, and the received baseband signal, $S_{rx1bb}(t)$). In the loopback receiver embodiment of FIG. 4, $S_{tx1bb}(t)$ may also be effectively DFT processed by looping back the first RF signal Stx1_rf, converting the same to baseband to recover $S_{tx1bb}(t)$, and DFT processing $S_{tx1bb}(t)$. The DFT processing of $S_{tx1bb}(t)$ and $S_{rx1bb}(t)$ may be performed using a coherent clock that has maintained its phase, and the DFTs may start at (K×T) μs apart. In other words, the first sample of the RX baseband signal for which the DFT calculation is performed occurs (K×T) μs after the first sample of the recovered TX baseband signal in the loopback path for which a DFT calculation is performed (where processing delays between baseband and RF are calibrated out).

Accordingly, the TX and RX (high precision) time stamps at each of devices 10-1 and 10-2 may both be achieved through DFT engine 428. The correlations may start exactly at an integer multiple of T μs apart (between the correlation performed at each device on its own TX and RX signals). This (T μs) is the repetition rate of the 101010 pattern so that the phase difference between the two correlation outputs will wrap on this period, i.e., the phase difference will be constant after modulo 2π operation.

At S216, second device 10-2 transmits the first and second CGRs to first device 10-1 using any suitable protocol (e.g., a predetermined time after operation S208, or after another handshake with first device 10-1). At S218, these are received at first device 10-1 where they are used along with the third and fourth CGRs to compute the propagation delay τ, as described below. Alternatively, first device 10-1 transmits the third and fourth CGRs to second device 10-2 and second device computes the propagation delay τ.

Figure 5:
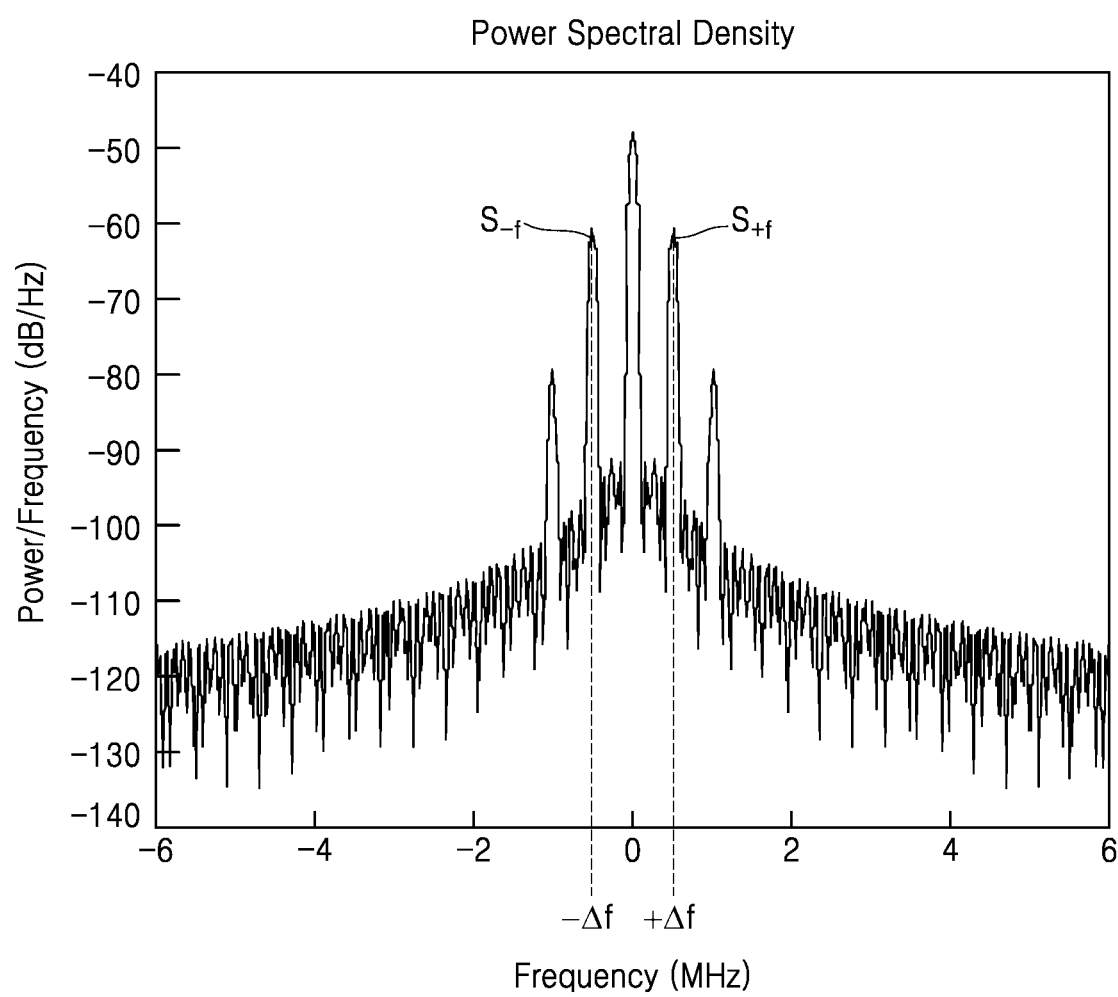
FIG. 5 is a graph of example baseband power spectral density computed for a dual tone sounding signal that may be transmitted using the method of FIG. 2.

FIG. 5 is a graph of example baseband power spectral density computed for a dual tone sounding signal that may be transmitted using the method of FIG. 2. The graph illustrates that the first and/or second RF signal may have spectral components at fc (corresponding to 0 Hz in FIG. 5 when downconverted to baseband), (fc−Δf) and (fc+Δf), as well as at other frequencies. Positive and negative frequency components $S_{+f}$ and $S_{-f}$ may be extracted using DFT engine 428 of FIG. 4 and may coincide with the highest positive and negative peak spectral components (aside from the DC component) of the theoretical baseband signal, respectively.

Returning to FIG. 3, the timing diagram facilitates understanding of a set of equations to follow for computing the first through fourth CGRs and the propagation delay τ based on the CGRs. The equations also facilitate understanding the property of baseband coherence. As noted earlier, t1 is the time when the dual tone signal (first RF signal) is transmitted, where t1 may be aligned with the device 1 sampling clock. Time t2 is the starting time at which the DFT is performed in device 2 on the received dual tone signal (the time of the first sample used in the DFT computations). Time t3 is the time at which the dual tone signal is transmitted from device 2; and t4 is the starting time (the time of the first sample) at which the DFT is performed on the received signal at device 1. Times t1, t2, t3 and t4 may be referenced to the same absolute time reference. (In the loopback receiver embodiment, an additional time t5, not shown in FIG. 3, may be relevant to achieving baseband coherence at device 10-2 in a slightly different manner based on "DFT alignment" between baseband signals BBR1 and BBT2, discussed later.)

As mentioned, the condition for baseband coherence in this example is that t4−t1 and t3−t2 are each a multiple of T (the periodicity of the dual tone signal, e.g., 2 us in Bluetooth®). Note that because the coarse synchronization accuracy in t2 and t4 won't affect the final timing measurement accuracy, the choice of t2 and t4 has freedom to guarantee the above baseband coherence condition. This will allow cancellations of some terms in the algebra to extract the information for phase based ranging (shown later).

For simplicity and without losing generality, frequency offset may be neglected and the initial phase is assumed to be 0 at time t1. The ADC clock may be synchronous with the DFT clock, but if not, a fractional resampler may be run continuously throughout the exchange. An assumption that may not be made is the local oscillator 410 retaining its phase continuation between TX and RX, i.e., the RF phase difference between two time instants (TX and RX time instants) will remain the same. For that reason, the equations below are not based on an assumption that transmit and receive phases have the same value.

At the device 1 (device 10-1) transmitter RF output, the first RF signal may be expressed as:

$$S_{tx1\_rf} = e^{i(\theta_{1t}+\omega_{lo}t)} \cdot [e^{-i\omega_m(t-t1)} + e^{+i\omega_m(t-t1)}],$$

where $\theta_{1t}$ is the RF phase at device 1 at time instant $t_1$.
At the device 2 (device 10-2) receiver baseband input:

$$S_{rx2bb}(t) = e^{i(\theta_{1t}+\omega_{lo}(t-\tau))} \cdot e^{-i(\theta_{2r}+\omega_{lo}t)} \cdot [e^{-i\omega_m(t-t1-\tau)} + e^{+i\omega_m(t-t1-\tau)}],$$

where $\theta_{2r}$ is the RF phase at device 2 at time instant $t_2$.
The per tone baseband correlation at device 2 at time t2 (in other words, the DFT of $S_{rx2bb}(t)$ performed using samples beginning at time $t_2$) to obtain the above-discussed first and second CGRs, $G_{rx2}(t_2, -\omega_m)$ and $G_{rx2}(t_2, +\omega_m)$, respectively corresponding to the first and second tones fc−Δf and fc+Δf, of Stx1_rf, may be computed by the DFT engine 428 as follows:

$$G_{rx2}(t_2,+\omega_m) = \Sigma_{n=0}^{N-1} e^{i(\theta_{1t}-\theta_{2r}-\omega_{lo}\tau)} \cdot [e^{-i\omega_m(t2+Tn-t1-\tau)} + e^{+i\omega_m(t2+Tn-t1-\tau)}] \cdot e^{-i\omega_m Tn} = e^{i(\theta_{1t}-\theta_{2r}-\omega_{lo}\tau)} \cdot e^{+i\omega_m(t2-t1-\tau)}$$

$$G_{rx2}(t_2,-\omega_m) = \Sigma_{n=0}^{N-1} e^{i(\theta_{1t}-\theta_{2r}-\omega_{lo}\tau)} \cdot [e^{-i\omega_m(t2+Tn-t1-\tau)} + e^{+i\omega_m(t2+Tn-t1-\tau)}] \cdot e^{+i\omega_m Tn} = e^{i(\theta_{1t}-\theta_{2r}-\omega_{lo}\tau)} \cdot e^{-i\omega_m(t2-t1-\tau)}.$$

The equations above are valid on the assumption that $$\omega_m = M\frac{2\pi}{T},$$

where M is any integer. Note that the DFT calculations above may be performed using a Fast Fourier Transform (FFT), which is understood as one type of DFT.

At the device 2 transmitter RF output:

$$S_{tx2\_rf} = e^{i(\theta_{2t}+\omega_{lo}t)} \cdot [e^{-i\omega_m(t-t3)} + e^{+i\omega_m(t-t3)}],$$

where $\theta_{2t}$ is the RF phase at device 2 at time instant $t_3$.
At the device 1 receiver baseband input:

$$S_{rx1bb}(t) = e^{i(\theta_{2t}+\omega_{lo}(t-\tau))} \cdot e^{-i(\theta_{1r}+\omega_{lo}t)} \cdot [e^{-i\omega_m(t-t3-\tau)} + e^{+i\omega_m(t-t3-\tau)}]$$

The per tone correlation at device 1 baseband to obtain the above-discussed third and fourth CGRs is performed at time $t_4$:

$$G_{rx1}(t_4,+\omega_m) = \Sigma_{n=0}^{N-1} e^{i(\theta_{2t}-\theta_{1r}-\omega_{lo}\tau)} \cdot [e^{-i\omega_m(t4+Tn-t3-\tau)} + e^{+i\omega_m(t4+Tn-t3-\tau)}] \cdot e^{-i\omega_m Tn} = e^{i(\theta_{2t}-\theta_{1r}-\omega_{lo}\tau)} \cdot e^{+i\omega_m(t4-t3-\tau)}.$$

$$G_{rx1}(t_4,-\omega_m) = \Sigma_{n=0}^{N-1} e^{i(\theta_{2t}-\theta_{1r}-\omega_{lo}\tau)} \cdot [e^{-i\omega_m(t4+Tn-t3-\tau)} + e^{+i\omega_m(t4+Tn-t3-\tau)}] \cdot e^{+i\omega_m Tn} = e^{i(\theta_{2t}-\theta_{1r}-\omega_{lo}\tau)} \cdot e^{-i\omega_m(t4-t3-\tau)}.$$

The two sets of correlation output (first through fourth CGRs), re-listed below, may be used to estimate a one way signal propagation delay (and correspondingly, the distance between the two devices):

$$G_{rx2}(t_2,+\omega_m) = e^{i(\theta_{1t}-\theta_{2r}-\omega_{lo}\tau)} \cdot e^{+i\omega_m(t_2-t_1-\tau)}$$

$$G_{rx2}(t_2,-\omega_m) = e^{i(\theta_{1t}-\theta_{2r}-\omega_{lo}\tau)} \cdot e^{-i\omega_m(t_2-t_1-\tau)}$$

$$G_{rx1}(t_4,+\omega_m) = e^{i(\theta_{2t}-\theta_{1r}-\omega_{lo}\tau)} \cdot e^{+i\omega_m(t_4-t_3-\tau)}$$

$$G_{rx1}(t_4,-\omega_m) = e^{i(\theta_{2t}-\theta_{1r}-\omega_{lo}\tau)} \cdot e^{-i\omega_m(t_4-t_3-\tau)}$$

It was observed by the present inventors that because $$\omega_m = M\frac{2\pi}{T},$$

if $t_4-t_3 = t_1-t_2+nT$, i.e., their difference is a multiple of the periodicity of the dual tone baseband signal, it will not affect the equations' validity.

By maintaining baseband coherence we can have the constraint $t_4-t_1=Tn_1$ and $t_3-t_2=Tn_2$, where $n_1$ and $n_2$ are integers. Combining these two expressions results in:

$$(t_4-t_1)-(t_3-t_2) = \frac{2\pi}{\omega_m}(n_1-n_2),$$

$$=> (t_4-t_3)-(t_1-t_2) = \frac{2\pi}{\omega_m}(n_1-n_2),$$

$$=> (t_4-t_3) = (t_1-t_2) + \frac{2\pi}{\omega_m}(n_1-n_2).$$

The exponentials will wrap with every multiple of $2\pi$, so that the equations above may be rewritten as follows by substituting $(t_4-t_3)$ with $$(t_1-t_2)+\frac{2\pi}{\omega_m}(n_1-n_2):$$

$$G_{rx2}(t_2,+\omega_m) = e^{i(\theta_{1t}-\theta_{2r}-\omega_{lo}\tau)} \cdot e^{+i\omega_m(t_2-t_1-\tau)} \quad (1)$$

$$G_{rx2}(t_2,-\omega_m) = e^{i(\theta_{1t}-\theta_{2r}-\omega_{lo}\tau)} \cdot e^{-i\omega_m(t_2-t_1-\tau)} \quad (2)$$

$$G_{rx1}(t_4,+\omega_m) = e^{i(\theta_{2t}-\theta_{1r}-\omega_{lo}\tau)} \cdot e^{+i\omega_m(t_4-t_3-\tau)} \quad (3)$$

$$G_{rx1}(t_4,-\omega_m) = e^{i(\theta_{2t}-\theta_{1r}-\omega_{lo}\tau)} \cdot e^{-i\omega_m(t_4-t_3-\tau)} \quad (4)$$

For convenience, the phase for the terms expressed in (1)-(4) may be denoted as:

$$\varphi_{rx2}(t_2,+\omega_m) = \angle G_{rx2}(t_2,+\omega_m) = \theta_{1t}-\theta_{2r}-\omega_{lo}\tau+\omega_m(t_2-t_1-\tau) \quad (5)$$

$$\varphi_{rx2}(t_2,-\omega_m) = \angle G_{rx2}(t_2,-\omega_m) = \theta_{1t}-\theta_{2r}-\omega_{lo}\tau-\omega_m(t_2-t_1-\tau) \quad (6)$$

$$\varphi_{rx1}(t_4,+\omega_m) = \angle G_{rx1}(t_4,+\omega_m) = \theta_{2t}-\theta_{1r}-\omega_{lo}\tau+\omega_m(t_1-t_2-\tau) \quad (7)$$

$$\varphi_{rx1}(t_4,-\omega_m) = \angle G_{rx1}(t_4,-\omega_m) = \theta_{2t}-\theta_{1r}-\omega_{lo}\tau-\omega_m(t_1-t_2-\tau) \quad (8)$$

There are various ways of manipulating these equations to achieve a ranging estimate. For instance, the phases can be subtracted to get:

$$(5)-(6) = \Delta\varphi_{rx2} = \varphi_{rx2}(t_2,+\omega_m)-\varphi_{rx2}(t_2,-\omega_m) = 2\omega_m(t_2-t_1-\tau) \quad (11)$$

$$(8)-(7) = \Delta\varphi_{rx1} = \varphi_{rx1}(t_4,+\omega_m)-\varphi_{rx1}(t_4,-\omega_m) = 2\omega_m(t_1-t_2-\tau) \quad (12).$$

The round trip (2 way) time can be estimated from the additions of these equations as:

$$\hat{\tau}_{two\,way} = \frac{-(\Delta\varphi_{rx2}+\Delta\varphi_{rx1})}{4\omega_m}. \quad (13)$$

This will give results equivalent to a related art sounding sequence ranging measurement with the advantage of being able to avoid a coarse estimate of the time of arrival (ToA). The equations also allow a one way range to be extracted. For instance, adding (5) to (8) and (6) to (7) gives:

$$(5)+(8) = \theta_{1t}-\theta_{2r}+\theta_{2t}-\theta_{1r}-2\omega_{lo}\tau+2\omega_m(t_2-t_1) \quad (14)$$

$$(6)+(7) = \theta_{1t}-\theta_{2r}+\theta_{2t}-\theta_{1r}-2\omega_{lo}\tau-2\omega_m(t_2-t_1) \quad (15).$$

Equations (14) and (15) can then be differenced to calculate $(t_2-t_1)$:

$$(t_2-t_1) = \frac{((14)-(15))}{4\omega_m}. \quad (16)$$

The value for $(t_2-t_1)$ can then be inserted into equations (11) or (12) to arrive at a value for the signal propagation delay $\tau$ as follows:

$$\hat{\tau}_{one\,way\,1\,to\,2} = \left(\frac{(16)-(11)}{2\omega_m}\right) \quad (17)$$

$$\hat{\tau}_{one\,way\,2\,to\,1} = \left(\frac{-(16)-(12)}{2\omega_m}\right), \quad (18)$$

where $\hat{\tau}_{one\,way\,1\,to\,2}$ should be the same as $\hat{\tau}_{one\,way\,2\,to\,1}$.

Under the assumption that $\tau$ as defined by eqn. (17) or (18) is a propagation delay for a line of sight distance d1, the distance $d1=c\tau$ (c=speed of light).

Either of the signal propagation delay results of eqns. (17) or (18) may be used as a final result to determine the distance d1 measured in association with the carrier frequency fc, since they are approximately equal if the measurement is done correctly. (It is noted that in a multi-path environment, different results for d1 may be measured using different respective carrier frequencies over a wide bandwidth; this is discussed below in connection with FIG. 6.) Since t is a propagation delay from device 1 to device 2, or vice versa, it is a one way propagation delay. Accordingly, the method 200 may be referred to as a one way ranging method. A one way ranging method has at least two benefits over a two way ranging method that measures a round trip propagation time. First, for a given minimum frequency step (when the measurement is performed at different carriers each separated from an adjacent carrier by a frequency step) its unambiguous distance (before a $2\pi$ wrap) is twice as far. For instance, in example implementations based on Bluetooth® Low Energy (BLE) and a channel separation of 1 MHz, this distance increases from 150 m to 300 m. A second advantage is that for a channel with more than one ray (i.e., a multi-path channel), a standard two way range is actually a convolution of the two paths (device 1 to 2 and device 2 to 1). By reciprocity these paths are identical but they still form convolutional products as discussed in connection with FIG. 8 below. The generation of such convolutional products is avoided with the one way ranging method employing baseband coherence herein.

Incidentally, FIGS. 2 and 3 were mainly described earlier in the context of generating the dual tone RF signals as FSK signals (of which a Gaussian FSK signal is one type of FSK signal) using the transceiver circuitry of FIG. 4. However, as mentioned earlier, OFDM signals such as WLAN signals may be alternatively generated and exchanged in the ranging measurements. In an example, a WLAN packet compatible with the IEEE 802.11ax standard uses OFDM modulation with 312.5 KHz sub-carrier spacing, which translates to a 3.2 μs OFDM symbol duration. The differential phase between two adjacent sub-carriers will wrap-around when delay is a multiple of 3.2us. To take advantage of this baseband coherence, referring to the timing diagram of FIG. 3, each station may (or needs to) ensure that the time spacing between two events (t1 and t4 for device 1; t2 and t3 for device 2) is a multiple of 3.2 μs; this is equivalent to the multiple of 2us time spacing in the Bluetooth® case. For device 2, based on a coarse sync timing just prior to t2, phase measurements may be taken to obtain the CFRs; the sounding waveform may then be transmitted back at t3, which is a multiple of 3.2 μs spaced from t2. Device 1 may then select t4, which is close to its coarse sync timing and is also a multiple of 3.2us spaced from t1. The rest of the calculation will be the same as described in connection with FIGS. 2-3. Compensation may be made (or needs to be made) for the relative phases of the OFDM tones in the packet. These tones, however, will have known values for a fine timing measurement (FTM) exchange, whereby the compensation may be easily accomplished.

As noted earlier, in operation S210 and in the above equations (1) to (18), in a first example method (and wireless device implementing the same) to achieve baseband coherence at device 10-2, the second RF signal $S_{tx2\_rf}$ is transmitted at a time t3 occurring (J×T) time units after time t2, where J is an integer. In a second example to achieve baseband coherence at device 10-2, which example uses the loopback receiver architecture at least at the second device 10-2, DFT alignment may suffice to achieve baseband coherence, such that (t3–t2) does not necessarily equal (J×T). This example may be understood as follows:

At the second device 10-2 transmitter, the first RF signal may be as defined earlier:

$$S_{tx2\_rf} = e^{i(\theta_{2t}+\omega_{lo}t)} \cdot [e^{-i\omega_m(t-t3)} + e^{+i\omega_m(t-t3)}].$$

Using the loopback receiver mechanism, the method may loop back the transmitted signal $S_{tx2\_rf}$ to the device 2's own receiver (e.g., including mixers 424, samplers 427, ADCs 426 and DFT engine 428), and generate a baseband signal loopback signal $S_{lb2_{bb}}(t)$ (effectively derived from the second RF signal) which may be expressed as follows:

$$S_{lb2_{bb}}(t) = e^{i(\theta_{2t}+\omega_{lo}t)} \cdot e^{-i(\theta_{2lb}+\omega_{lo}t)} \cdot [e^{-i\omega_m(t-t3)} + e^{+i\omega_m(t-t3)}], \quad (19)$$

where $\theta_{2lb}$ is the phase of second RF signal and may be arbitrary.

The method may then take the DFTs (and effectively obtain CGRs corresponding to the first and second tones of the second RF signal) using DFT engine 428 with a starting time of t5 (which may occur after t2):

$$G_{lb2}(t_5,+\omega_m) = \Sigma_{n=0}^{N-1} e^{i(\theta_{2t}-\theta_{2lb})} \cdot [e^{-i\omega_m(t5+Tn-t3)} + e^{+i\omega_m(t5+Tn-t3)}] \cdot e^{-i\omega_m Tn} = e^{i(\theta_{2t}-\theta_{2lb})} \cdot e^{+i\omega_m(t5-t3)}, \quad (20)$$

$$G_{lb2}(t_5,-\omega_m) = \Sigma_{n=0}^{N-1} e^{i(\theta_{2t}-\theta_{2lb})} \cdot [e^{-i\omega_m(t5+Tn-t3)} + e^{+i\omega_m(t5+Tn-t3)}] \cdot e^{+i\omega_m Tn} = e^{i(\theta_{2t}-\theta_{2lb})} \cdot e^{-i\omega_m(t5-t3)}, \quad (21)$$

where $G_{lb2}(t_5, -\omega_m)$ may be referred to as a fifth CGR (or a first "loopback CGR"), corresponding to the first tone of the second RF signal, and $G_{lb2}(t_5, +\omega_m)$ may be referred to as a sixth CGR (or a second loopback CGR), corresponding to the second tone of the second RF signal.

Now, the above-described original four CGR products (eqns. (1) to (4) above are repeated here:

$$G_{rx2}(t_2,+\omega_m) = e^{i(\theta_{1t}-\theta_{2r}-\omega_{lo}\tau)} \cdot e^{+i\omega_m(t2-t1-\tau)} \quad (1)$$

$$G_{rx2}(t_2,-\omega_m) = e^{i(\theta_{1t}-\theta_{2r}-\omega_{lo}\tau)} \cdot e^{-i\omega_m(t2-t1-\tau)} \quad (2)$$

$$G_{rx1}(t_4,+\omega_m) = e^{i(\theta_{2t}-\theta_{1r}-\omega_{lo}\tau)} \cdot e^{+i\omega_m(t4-t3-\tau)} \quad (3)$$

$$G_{rx1}(t_4,-\omega_m) = e^{i(\theta_{2t}-\theta_{1r}-\omega_{lo}\tau)} \cdot e^{-i\omega_m(t4-t3-\tau)} \quad (4)$$

However, the presently described embodiment may perform the multiplications $G_{rx1}(t_4, +\omega_m)G^*_{lb2}(t_5, +\omega_m)$ and $G_{rx1}(t_4, -\omega_m)G^*_{lb2}(t_5, -\omega_m)$, where * donates the complex conjugate, to obtain:

$$G_{rx1}(t_4,+\omega_m)G^*_{lb2}(t_5,+\omega_m) = e^{i(\theta_{2lb}-\theta_{1r}-\omega_{lo}\tau)} \cdot e^{+i\omega_m(t4-t5-\tau)} \quad (22)$$

$$G_{rx1}(t_4,-\omega_m)G^*_{lb2}(t_5,-\omega_m) = e^{i(\theta_{2lb}-\theta_{1r}-\omega_{lo}\tau)} \cdot e^{-i\omega_m(t4-t5-\tau)} \quad (23)$$

These equations (22) and (23) are identical to the previous equations (3) and (4) for $G_{rx1}(t_4, +\omega_m)$ and $G_{rx1}(t_4, -\omega_m)$ except that $\theta_{2lb}$ has replaced $\theta_{2t}$ (note that this arbitrary phase cancels anyway); and the time $t_5$ replaces $t_3$ so the timing constraint will apply to $t_5$. As a result, $$t_5 - t_2 = \left(\frac{2\pi}{\omega_m}\right) n_2$$

and the transmission time $t_3$ of the second RF signal has no constraint because it has cancelled.

Accordingly, eqn. (18) may be analogously used in correspondence with eqns. (22) and (23) in the presently described embodiment to obtain the propagation delay τ and corresponding distance d1 between device 1 and device 2.

Note that in forming the product $G_{rx1}(t_4, -\omega_m)G^*_{lb2}(t_5, -\omega_m)$, results between device 1 and device 2 have been mixed. In an example, the result for $G_{rx1}$ is transferred from device 1 to device 2 and device 2 performs the processing for eqns. (22) and (23). In another example, device 2 transfers its results to device 1 and device 1 performs the processing for eqns. (22) and (23). In this case, both complex gain loopback results and $G_{lb2}$ and the RX complex gain results $G_{rx2}$ (the results for the first and second CGRs) are transferred to device 1.

Implementations can be mixed and matched between device 1 and device 2. Thus, the just-described technique is analogously applied to the device 1 in one example, but is not applied to device 1 in another example. In the former case, $G_{rx1}(t_4, +\omega_m)$ and $G_{rx1}(t_4, -\omega_m)$ may be corrected in the same way that $G_{rx2}$ is corrected as just described. However, if it had satisfied the TX to DFT timing constraint then the earlier expressed equations for (1) and (2) may be used even though a loopback receiver is implemented on device 2.

Figure 6:
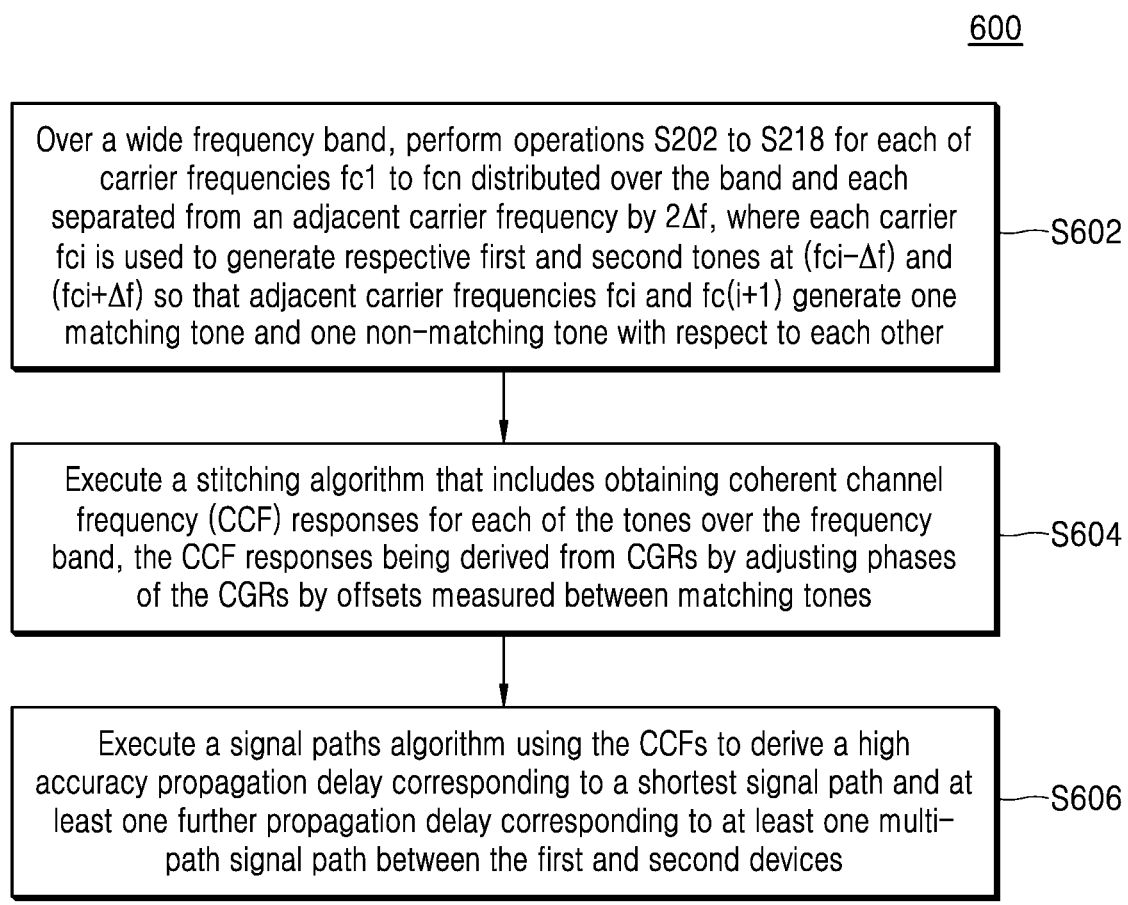
FIG. 6 is flow chart illustrating a ranging method that resolves multi-path signals according to an embodiment.

FIG. 6 is flow chart illustrating a ranging method, 600, that resolves multi-path signals according to an embodiment. Method 600 may be considered an expansion of ranging method 200 of FIG. 2. In a multi-path signal environment, multi-path signals may reduce the accuracy of the measurement result taken with just a single carrier frequency. Ranging method 600 resolves this issue by performing the measurement at each of multiple carrier frequencies over a desired bandwidth. Additionally, method 600 may accurately detect the multi-path signals, both in terms of propagation distance and angle of arrival (AoA) to the receiving device.

With method 600, at S602, operations S202 to S218 may be performed for each of carrier frequencies fc1 to fcn distributed over a wide frequency band, e.g., on the order of 40 MHz in a Bluetooth® example. Each of carriers fc1 to fcn is separated from an adjacent carrier by $2\Delta f$, where each carrier fci (i=any of 1 to n) is used to generate respective first and second tones at (fci−$\Delta f$) and (fci+$\Delta f$). In this manner, adjacent carriers fci and fc(i+1) (i=1 to (n−1)) generate one matching tone and one non-matching tone with respect to each other.

At S604, the method executes a stitching algorithm that includes obtaining coherent channel frequency (CCF) responses for each of the tones over the frequency band. The CCF responses are derived from CGRs by adjusting phases of the CGRs by offsets measured between matching tones. This technique to derive CCFs is described in the '857 application, i.e., co-pending U.S. patent application Ser. No. 16/690,857 by the inventors herein, filed Nov. 21, 2019 and entitled ANGLE/TIME OF ARRIVAL MEASUREMENT USING NARROWBAND SIGNALS, now U.S. Pat. No. 11,525,909, which application is incorporated by reference herein in its entirety, which application is a two way ranging method, the stitching algorithm can be equally applied to the one way ranging method herein.

It is noted that in embodiments employing wideband hardware, such as in OFDM based communication (e.g., Wi-Fi®), CCF responses for all the OFDM tones may be derived even without the use of a stitching algorithm. However, if a stitching algorithm is incorporated in the ranging estimation for this case, an even wider bandwidth than that used for normal communications can be achieved for the ranging.

At S606, the method executes a signal paths algorithm using the CCFs to derive a high accuracy propagation delay corresponding to a shortest signal path and at least one further propagation delay corresponding to at least one multi-path signal path between the first and second devices. Some examples of the signal paths algorithm include an IFFT-based algorithm, and super-resolution techniques such as the MUltiple SIgnal Classification (MUSIC) algorithm, the Estimation of Signal Parameters via Signal Rotational Techniques (ESPRIT) algorithm, and the Pisarenko Harmonic Decomposition (PHD) algorithm. Note that any of the super-resolution algorithms may be used in conjunction with the IFFT-based algorithm to improve the accuracy of the latter.

Figure 7:
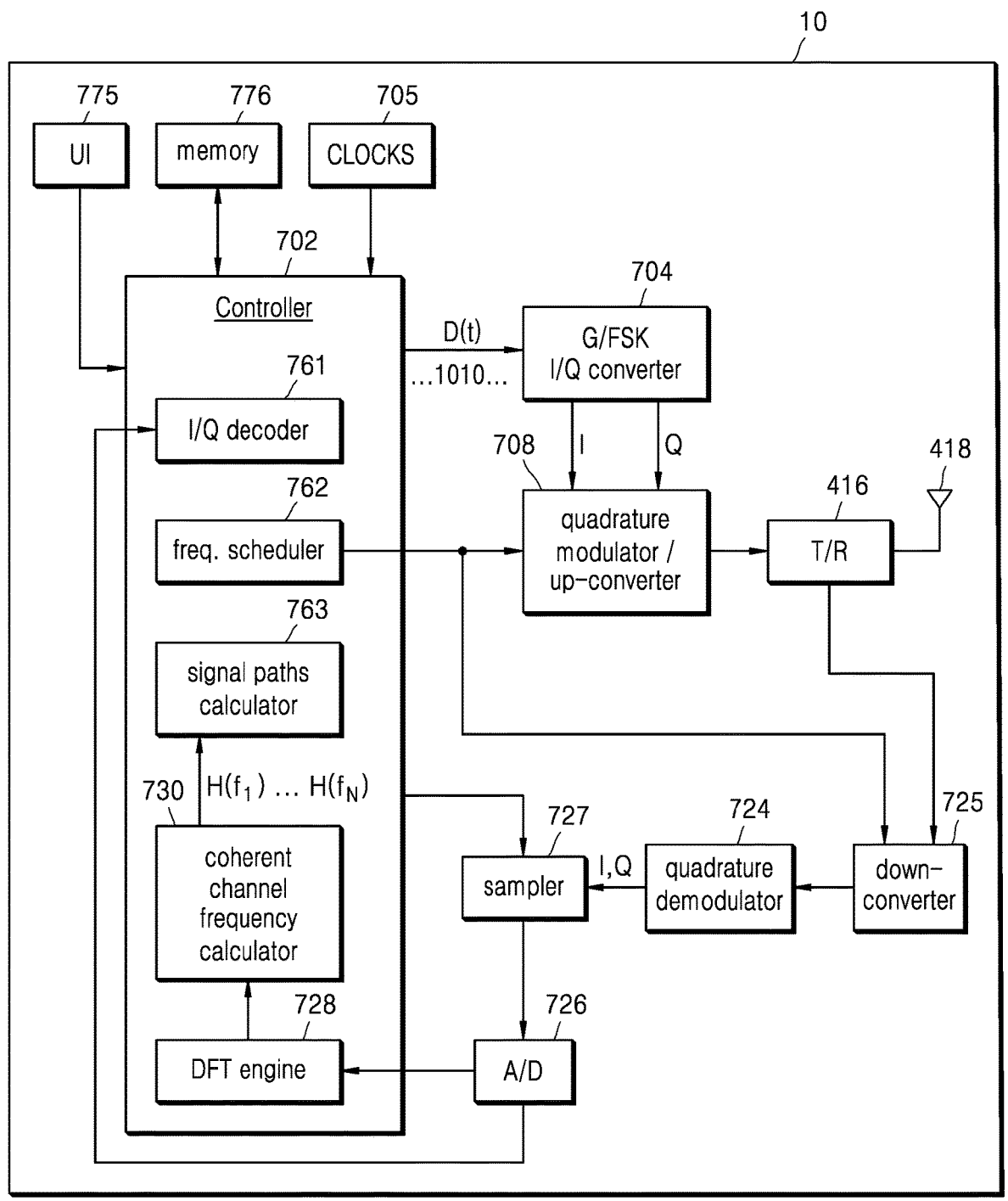
FIG. 7 is a block diagram of example circuitry within a wireless device that may perform operations in the method of FIG. 6.

FIG. 7 is a block diagram of example circuitry within a wireless device 10 (any of first or second devices 10-1 or 10-2) that may perform the operations in the method of FIG. 6. A controller 702 may control the overall operations of device 10, including the functions of controller 402 discussed above, but carried out in association with each of carrier frequencies fc1 to fcn. To this end, controller 702 may include a frequency scheduler 762 that generates a control signal C1 to control the carrier frequency of a quadrature modulator/upconverter 708 (e.g., formed by LO 410, delay 409, mixers 408_1 and 408_2, adder 409 and PA 412 of FIG. 4).

Controller 702 may generate the data signal D(t) (either D1(t) or D2(2)) and output the same to G/FSK I/Q converter 704 (akin to modulator 404 providing Gaussian or traditional FSK in I and Q channels). For each carrier frequency fci (i=1 to n), the remaining components may perform the same functions as described above in connection with FIGS. 2-4. To this end, device 10 may include a clocks generator 705 for providing a sampling clock to a sampler 727 (akin to samplers 427), a DAC clock to any DACs in quadrature modulator/up-converter 708, a DFT clock signal to DFT engine 728 (akin to DFT engine 428), etc. Down-converter 725 and quadrature modulator 724 may together include LNA 420, mixers 424_1 and 424_2, LO 410 and delay 409. Note that components 704 and 708 may be replaced by a polar modulator as described earlier.

Controller 702 may further include a CCF response calculator 730 and a signal paths calculator 763. For each measurement at a carrier frequency fci, DFT engine 728 may derive a DFT result at least for fci+$\Delta f$ and fci−$\Delta f$. These results are applied to CCF response calculator 730 which may perform the operation S604 and thereby obtain a complete set of CCF responses over the frequency band of interest once the CGR measurements are completed for all carriers fc1 to fcn. Signal paths calculator 763 may then perform operation S606 based on the complete set of CCF responses to compute a final distance measurement for the shortest signal path and any multi-path signal path.

It is noted here that device 10 may further include a memory 776 and a user interface (UI) 775. Controller 702 may include at least one processor that reads instructions stored within memory 776 to execute its operations, and which may store/selectively retrieve interim and final data within memory 776. Controller 702 may also interact with a user interface (UI) 775 which may receive user inputs to initiate ranging measurements. When it is desired to decode the I and Q signals to recover the data they represent, as in normal communication operations, the digitized output of ADC 726 is decoded by an I/Q decoder 761 within controller 702.

FIG. 8 is a graph of simulated propagation path distance measurement results of a line of sight signal and a multi-path signal between wireless devices as measured by an embodiment in comparison to a related art method. The solid line 90 represents a simulated measurement (in a lab test) using the one way baseband coherence method of FIG. 6. The dotted line 91 represents a simulated measurement using a related art two way (RTT) ranging measurement. In the example test, a line of sight path was set up at a distance d1 between devices 1 and 2, and one multi-path path was set up with a multi-path distance d2. The peaks 84 and 86 represent power of received signals measured by the baseband coherence method, which correctly correspond to the respective distances d1 and d2. While the related art RTT measurement also correctly detected signals at distances d1 and d2 (but with less signal energy as compared to the baseband coherence method), it also detected peaks 81 at several other distances, thereby falsely detecting additional multi-path signals. This is because, for a channel with more than one ray (i.e., multi-path) the related art two way range measurement actually measures a convolution of the two paths (device 1 to device 2 and device 2 to device 1). By reciprocity these paths are identical but they still form convolutional products as demonstrated in FIG. 8. Note that the simulated test measurements were done using an inverse fast fourier transform (IFFT) of amplitudes and phases measured across a wide bandwidth; the same or similar results may be obtained using a MUSIC super resolution algorithm or other suitable signal paths algorithm.

In other simulated test measurements, a ray model was constructed with two closely spaced (in distance) paths. While the baseband coherence method can successfully resolve the two rays propagating along the respective paths, the related art two way method falsely detects a signal at a distance between those of the two paths, and the falsely detected signal has higher energy than signals detected from the two paths. Accordingly, the baseband coherence method provides superior results in a variety of signal environments.

Accordingly, embodiments of a ranging method and device of the inventive concept as described above assert baseband coherence between the transmitted signal from the device and the correlations performed on reception. By maintaining the baseband coherence, a superior one way ranging estimate is achieved. On the other hand, a sounding signal RTT estimate and a standard phase based ranging estimate supported by the current Bluetooth® standard are each two way methods. As noted earlier, advantages of a one way ranging measurement employing baseband coherence include superior multi-path ray detection, avoiding false ray detection, and doubling the measurable distance as compared to two way ranging. Similar benefits may be realized in other wireless communication technologies, e.g., WLAN, Zigbee®, LTE®, 5G, etc. For instance, the methods herein may be applied to and benefit any wireless communication technology employing FSK-like modulation with a repetitive pattern.

Moreover, related art one way ranging estimates require maintaining phase coherence between the LOs of the two devices across an exchange of tones. In practice this means that each LO must be designed so its frequency can be changed on a clock cycle accurate timing grid. Further, each LO needs to maintain phase continuity when it changes frequency. Both these features are difficult to achieve and/or require a prohibitively complex implementation. Embodiments of the present inventive concept move requirements to baseband coherence which is easier to implement.

Exemplary embodiments of the inventive concept have been described herein with reference to signal arrows, block diagrams (e.g., computing blocks of FIG. 7 or the flowcharts of FIGS. 2 and 6) and algorithmic expressions. Each block of the block diagrams and combinations of blocks in the block diagrams, and operations according to the algorithmic expressions can be implemented by hardware (e.g., processing circuitry of controller 402 or 702 in cooperation with memory 776) accompanied by computer program instructions. Such computer program instructions may be stored in a non-transitory computer readable medium (e.g. memory 776) that can direct a computer, other programmable data processing apparatus, or other devices to function in a particular manner, such that the instructions stored in the computer readable medium produce an article of manufacture including instructions which implement the function/act specified in the block diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

The above-described methods according to the inventive concept can be implemented in hardware, firmware or via the use of software or computer code that can be stored in a recording medium such as a CD ROM, RAM, a floppy disk, a hard disk, or a magneto-optical disk or computer code downloaded over a network originally stored on a remote recording medium or a non-transitory machine readable medium and to be stored on a local recording medium, so that the methods described herein can be rendered using such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing described herein.

While the inventive concept described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A ranging method for measuring a distance between first and second wireless devices, comprising:
   exchanging dual tone radio frequency (RF) signals between the first and second wireless devices;
   at each of the first and second wireless devices, maintaining baseband coherence between baseband signals carried by the RF signals transmitted and received by each respective wireless device; and
   measuring the distance between the first and second wireless devices using the baseband signals.

2. The ranging method of claim 1, wherein:
   the exchanging of dual tone RF signals comprises transmitting, by the first wireless device, a first RF signal to the second device, and transmitting, by the second wireless device, a second RF signal to the first wireless device;
   the maintaining of baseband coherence at the second wireless device comprises:
      computing first and second complex gain responses (CGRs) respectively corresponding to respective first and second tones of the first RF signal separated in frequency by $2\Delta f$, through first Discrete Fourier Transform (DFT) processing of samples of a first baseband signal, derived from the first RF signal; and
      computing fifth and sixth CGRs respectively corresponding to first and second tones of the second RF signal separated in frequency by $2\Delta f$, using a loopback receiver path and second DFT processing of samples of a second baseband signal derived from the second RF signal,
      wherein the first DFT processing of samples begins at a first time point and the second DFT processing of samples begins at a second time point occurring $(J \times T)$ after the first time point, where J is an integer and T equals $1/\Delta f$; and the ranging method further comprising:
  computing, at the first wireless device, third and fourth CGRs respectively corresponding to the first and second tones of the second RF signal; and
  estimating a propagation delay of the first or second RF signal between the first and second devices using the first through sixth CGRs.

3. The ranging method of claim 2, wherein the estimate of the propagation delay is based in part on a multiplication product of the third CGR and a complex conjugate of the fifth CGR, and a multiplication product of fourth CGR and a complex conjugate of the sixth CGR.

4. The ranging method of claim 2, wherein the maintaining of baseband coherence at the first wireless device comprises DFT processing of samples of the second baseband signal taken at a time beginning at a time point occurring (K×T) after a time point at which the first RF signal is transmitted, where K is an integer.

5. The ranging method of claim 2, wherein the estimating of a propagation delay is performed at the first wireless device, and the method further comprising transmitting, by the second wireless device, a signal indicating the third, fourth, fifth and sixth CGRs to the first wireless device.

6. The ranging method of claim 1, comprising measuring the distance between the first and second wireless devices, the measuring including executing a stitching algorithm that obtains a coherent channel frequency (CCF) response, and executing a signal paths algorithm using the CCF to derive a first propagation delay corresponding to a shortest signal path and at least one further propagation delay corresponding to at least one multi-path signal path between the first and second wireless devices.

7. A ranging method comprising:
  at a first wireless device, transmitting at a first time point a first radio frequency (RF) signal having first and second tones separated in frequency by 2Δf;
  at a second wireless device:
    receiving the first RF signal and deriving a first baseband signal therefrom;
    computing first and second complex gain responses (CGRs) respectively corresponding to the first and second tones using Discrete Fourier Transform (DFT) processing of samples of the first baseband signal taken at a time beginning at a second time point; and
    generating a second RF signal having the first and second tones and transmitting the second RF signal at a third time point occurring (J×T) after the second time point, where J is an integer and T equals 1/Δf;
  at the first wireless device, receiving the second RF signal and deriving a second baseband signal therefrom, and computing third and fourth CGRs respectively corresponding to the first and second tones of the second RF signal using DFT processing of samples of the second baseband signal taken at a time beginning at a fourth time point occurring (K×T) after the first time point, where K is an integer; and
  estimating a propagation delay of the first or second RF signal between the first and second wireless devices using the first through fourth CGRs,
  wherein the propagation delay corresponds to a distance between the first and second wireless devices.

8. The ranging method of claim 7, wherein the estimating of a propagation delay is performed at the first wireless device, and the method further comprising transmitting, by the second wireless device, a signal indicating the third and fourth CGRs to the first device.

9. The ranging method of claim 7, wherein the first time point is aligned with a transition of a first sampling clock at the first wireless device, and the samples of the second baseband signal are taken at times coinciding with further transitions of the first sampling clock.

10. The ranging method of claim 7, wherein each of the first and second RF signals is a Frequency Shift Keying (FSK) modulated signal.

11. The ranging method of claim 7, wherein each of the first and second RF signals is a Gaussian Frequency Shift Keying (GFSK) modulated signal.

12. The ranging method of claim 11, wherein the GFSK modulated signal is a quadrature modulated signal.

13. The ranging method of claim 7, wherein each of the first and second RF signals is an orthogonal frequency division multiplexed (OFDM) signal.

14. The ranging method of claim 7, wherein each of the first and second RF signals is initiated with a bit sequence of a predetermined duration and composed of alternating 1's and 0's, the bit sequence having a bit rate equaling 2Δf.

15. The ranging method of claim 7, wherein the propagation delay is a first propagation delay, the first RF signal is generated using a first carrier frequency midway between the first and second tones of the first RF signal, and the method further comprising:
  obtaining further first through fourth CGRs using a second carrier frequency offset from the first carrier frequency by 2Δf, and a third RF signal transmitted from the first wireless device to the second wireless device based on the second carrier frequency, the third RF signal including a third RF frequency matching the second RF frequency and a fourth RF frequency higher than the third RF frequency by 2Δf;
  executing a stitching algorithm that includes obtaining a coherent channel frequency (CCF) response of the third RF frequency by adjusting a phase of a CGR corresponding to the third RF frequency by a phase offset to match a phase of CGR corresponding to the second RF, frequency, and adjusting a phase of another one of the further first through fourth CGRs corresponding to the fourth RF frequency by the same phase offset; and
  executing a signal paths algorithm using the CCF to derive a first propagation delay corresponding to a shortest signal path and at least one further propagation delay corresponding to at least one multi-path signal path between the first and second wireless devices.

16. The ranging method of claim 15, wherein the signal paths algorithm is selected from the group consisting of an IFFT-based algorithm, the Multiple Signal Classification (MUSIC) algorithm, the Estimation of Signal Parameters via Signal Rotational Techniques (ESPRIT) algorithm, and the Pisarenko Harmonic Decomposition (PHD) algorithm.

17. A first wireless device comprising:
  transceiver circuitry configured to:
    generate a first baseband signal;
    generate a first RF signal based on the first baseband signal and transmit the first RF signal to a second wireless device, the first RF signal including at least first and second tones;
    receive a second RF signal from the second wireless device, the second RF signal including at least the first and second RF tones;
    derive a second baseband signal from the received second RF signal; and
    maintain baseband coherence between the first baseband signal and the second baseband signal for a distance estimation, performed by the transceiver circuitry through use of the baseband coherence, between the first and second wireless devices.

18. The first wireless device of claim 17, wherein the transceiver circuitry comprises loopback receiver circuitry, and the baseband coherence is maintained using the loopback receiver circuitry.

19. The first wireless device of claim 17, wherein:
the transceiver circuitry comprises processing circuitry to perform the distance estimation; and
the distance estimation includes a computation of third and fourth complex gain responses (CGRs) corresponding to the first and second tones of the second RF signal, and an estimation of propagation delay using the third and fourth CGRs and first and second CGRs obtained from the second wireless device, the first and second CGRs corresponding to the first and second tones of the first RF signal received at the second wireless device, with baseband coherence maintained at the second wireless device.

20. The first wireless device of claim 17, wherein the transceiver circuitry is configured for measuring the distance between the first and second wireless devices, the measuring including executing a stitching algorithm that obtains a coherent channel frequency (CCF) response, and executing a signal paths algorithm using the CCF to derive a first propagation delay corresponding to a shortest signal path and at least one further propagation delay corresponding to at least one multi-path signal path between the first and second wireless devices.

* * * * *